United States Patent [19]
Berger et al.

[11] Patent Number: 6,112,986
[45] Date of Patent: Sep. 5, 2000

[54] METHOD AND APPARATUS FOR ACCESSING PATIENT INSURANCE INFORMATION

[76] Inventors: Richard S. Berger, 3270 Hwy. 27, Kendall Park, N.J. 08824; Michael A. Witt, 2528 Robert Trentr Jones Dr., Orlando, Fla. 32835

[21] Appl. No.: 08/986,431

[22] Filed: Dec. 8, 1997

[51] Int. Cl.⁷ ........................................................ G06K 5/00
[52] U.S. Cl. ............................................. 235/380; 235/375
[58] Field of Search .................................... 235/375, 492, 235/382, 380; 705/1; 395/24, 241

[56] References Cited

U.S. PATENT DOCUMENTS 5,764,523  6/1998  Yoshinaga et al. ..................... 364/483
5,832,447  11/1998  Ricker et al. ............................ 705/2
5,884,271  3/1999  Pitroda .................................... 705/1
5,890,129  3/1999  Spurgeon ................................. 705/4

*Primary Examiner*—Thien M. Le
*Attorney, Agent, or Firm*—Ward & Olivo

[57] ABSTRACT

Disclosed is a method and apparatus for data management related to managed service and health care systems and more particularly a managed insurance system which diminishes the associated burdens with insurance companies by putting the essential information on a credit card-like medium that is inexpensively produced by the insurance company and easily scanned into the office, hospital, or respective lab's computer. The device has a visible portion with data and insurance information contained at one or more locations. The card may be coated with a transparent protective laminate material.

4 Claims, 7 Drawing Sheets

FIG. 1

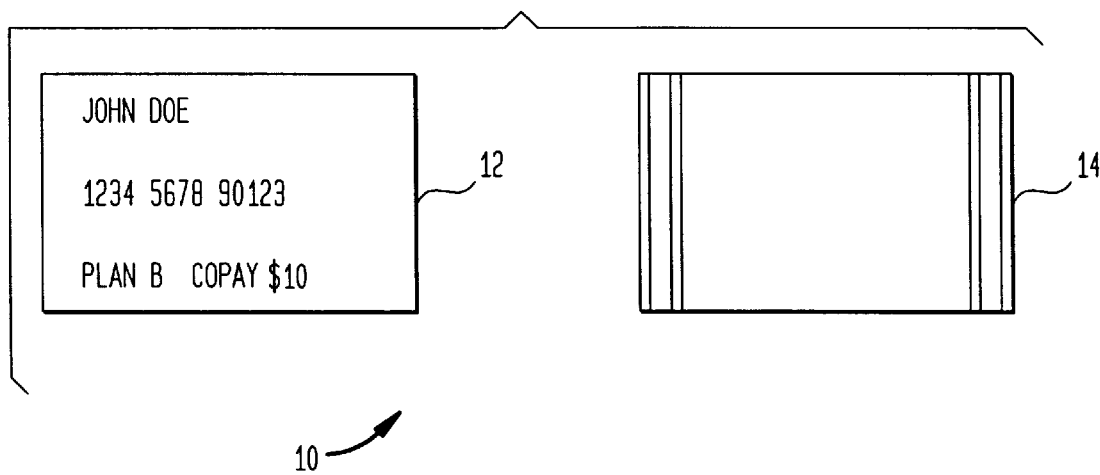

FIG. 2

|  | START | END | TOTAL CHARACTERS |
|---|---|---|---|
| NAME, FIRST | 0 | 14 | 15 |
| NAME, LAST | 15 | 29 | 15 |
| SS# | 30 | 38 | 9 |
| DOB | 39 | 44 | 6 |
| ADDRESS 1 | 45 | 64 | 20 |
| ADDRESS 2 | 65 | 84 | 20 |
| STATE | 85 | 86 | 2 |
| ZIP | 87 | 91 | 5 |
| PHONE(H) | 92 | 101 | 10 |
| PHONE(W) | 102 | 111 | 10 |
| EMPLOYER | 112 | 131 | 20 |
| INSURANCE PROVIDER | 132 | 151 | 20 |
| INSURANCE NUMBER | 152 | 166 | 15 |
| COPAY | 167 | 169 | 3 |
| PCP | 170 | 184 | 15 |
| DRUG ALLERGIES 1 | 185 | 204 | 20 |
| DRUG ALLERGIES 2 | 205 | 224 | 20 |
| DRUG ALLERGIES 3 | 225 | 244 | 20 |
| CRONIC MEDICATIONS 1 | 245 | 264 | 20 |
| CRONIC MEDICATIONS 2 | 265 | 284 | 20 |
| CRONIC MEDICATIONS 3 | 285 | 304 | 20 |
| CRONIC MEDICATIONS 4 | 305 | 324 | 20 |
| BILLING NAME | 325 | 344 | 20 |
| BILLING ADDRESS 1 | 345 | 364 | 20 |
| BILLING ADDRESS 2 | 365 | 384 | 20 |
| BILLING STATE | 385 | 386 | 2 |
| BILLING ZIP | 387 | 391 | 5 |
| CRONIC ILLNESS 1 | 392 | 411 | 20 |
| CRONIC ILLNESS 2 | 412 | 421 | 20 |
| CRONIC ILLNESS 3 | 422 | 441 | 20 |
| ALERT INFO 1 | 442 | 461 | 20 |
| ALERT INFO 2 | 462 | 481 | 20 |

FIG. 4

PATIENT REGISTRATION   DATE 11-13-96

NAME: JOHN DOE   DATE OF BIRTH: 1-1-96   AGE: ___
STREET ADDRESS: 555 ANYWHERE LANE   PHONE (H): 212-555-1212   (W): 212-555-1212
CITY, STATE, ZIP: EAST BRUNSWICK, NJ 08816   PERSONAL PHYSICIAN: STANLEY ZIMMERMAN
OCCUPATION/EMPLOYER: ELECTRONIC DATA SYSTEMS   SPOUSE'S OCCUPATION/EMPLOYER: HOUSEWIFE
IF UNDER 18 PARENT/GUARDIAN: DATA ENTRY CLERK   SPOUSE'S NAME: MARY

EMERGENCY CONTACT (OTHER THAN SPOUSE): JANE DOE   ADDRESS/PHONE: 201-555-5555
REFERRED BY: STANLEY ZIMMERMAN MD
REASON FOR VISIT: ACNE
CURRENT MEDICATIONS (INCLUDING NON-PRESCRIPTIONS): INSULIN PROCARDIA

DRUG ALLERGIES: PENNICILLIN CODEINE
PAST & CURRENT MEDICAL PROBLEMS: DIABETES HYPERTENSION

HISTORY OF HOSPITALIZATION: N/A

HISTORY OF SURGERIES: N/A

FAMILY HISTORY: N/A

INSURANCE AND BILLING INFORMATION

BILLING NAME (IF OTHER THAN PATIENT): ___   RELATIONSHIP: ___
BILLING ADDRESS: ___

| (1) INSURANCE COMPANY | USHC | ADDRESS | PO BOX 1125 BLUE BELL PA | EFFECTIVE DATE | 1-1-96 |
| SUBSCRIBER'S NAME | JOHN | ID | 123121234  GROUP: 0000  19422 | BENEFIT CODE | |

* PAYMENT REQUESTED AT TIME OF SERVICE - UNLESS PRIOR ARRANGEMENTS HAVE BEEN MADE *

ASSIGNMENT OF INSURANCE BENEFITS

I HEREBY AUTHORIZE DIRECT PAYMENT OF SURGICAL/MEDICAL BENEFITS TO DR. BERGER/KWEE, FOR SERVICES RENDERED BY HIM/HER IN PERSON OR UNDER HIS/HER SUPERVISION. I UNDERSTAND THAT I AM FINANCIALLY RESPONSIBLE FOR MY BALANCE NOT COVERED BY MY INSURANCE.

AUTHORIZATION TO RELEASE INFORMATION

I HEREBY AUTHORIZE DR. BERGER/KWEE TO RELEASE ANY MEDICAL OR INCIDENTAL INFORMATION THAT MAY BE NECESSARY FOR EITHER MEDICAL CARE OR IN PROCESSING APPLICATIONS FOR FINANCIAL BENEFITS.

I UNDERSTAND THAT THERE WILL BE A CANCELLATION FEE, IF THE OFFICE IS NOT NOTIFIED 24 HOURS PRIOR TO CANCELLATION OF AN APPOINTMENT, EXCEPT IN CASE OF AN EMERGECY.

PATIENT ___   DATE ___
PARENT/GUARDIAN ___   SIGNATURE ___

FIG. 5

```
────────────────────── * Patient * ──────────────────────
Acct #   19694      Balance    0.00   Status 3 Bal     0.00   Credits      .00
First    JOHN                  MI     Pri 25    US HEALTHCARE       1231212
Last     DOE
Address  555 ANYWHERE LANE            ┌────────────── * Primary Insurance * ──────────────┐
                                      │ 25    US HEALTHCARE                               │
ZipCode  08816                        │ **** Policy Holder's Insurance Info ****          │
City,ST  EAST BRUNSWICK        NJ     │ ID Number          123121234                      │
Home Ph  (212)555-1212                │ Group ID           0000                           │
Work Ph  (212)555-1212 Ext            │ Relation           S (S/P/C/O)                    │
                                      │ First Name         JOHN                           │
DOB      01/01/96   Age:              │ Last Name          DOE                            │
Sex      Male                         │ Address 1          555 ANYWHERE LANE              │
Marital  Married                      │ Address 2                                         │
SS #     123-12-1234                  │ Zip Code           08816                          │
Doctor   1 RICHARD BERGER, MD         │ City, St           EAST BRUNSWICK        NJ       │
                                      │ Date of Birth      01/01/1996                     │
                                      │ Sex (M/F)          M                              │
Last Visit    / /     Last Payment    │ Release Info       Y    Assign Benefits           │
First Visit   / /     Next Appt       └───────────────────────────────────────────────────┘
User Id DT            Date 11/13/96
```

FIG. 6

```
────────────────────── * Patient * ──────────────────────
Acct #   19694      Balance    0.00   Status 3 Bal     0.00   Credits      .00
First    JOHN                  MI     Pri 25    US HEALTHCARE       1231212
Last     DOE                          Sec
Address  555 ANYWHERE LANE            Oth
                                      WC
ZipCode  08816                        NF  30    COPAY $ 15              1231212
City,ST  EAST BRUNSWICK        NJ     Statements Yes  Guarantor DOE JOHN
Home Ph  (212)555-1212                Guar add   555 ANYWHERE LANE   EAST BRUNSWIC
Work Ph  (212)555-1212 Ext            Referral   34   ZIMMERMAN MD, STANLEY
                                      Collection
DOB      01/01/96   Age:
Sex      Male                         Contact MARY                  (212) 555-1212
Marital  Married                      Employer
SS #     123-12-1234                  Attorney
Doctor   1 RICHARD BERGER, MD         Pharmacy phone ( )  -
                                      Alert Msg Y   fictitious patient Last Visit    / /     Last Payment    0.00   (  / /   )
First Visit   / /     Next Appt
User Id DT            Date 11/13/96
```

FIG. 9

METHOD AND APPARATUS FOR ACCESSING PATIENT INSURANCE INFORMATION

BACKGROUND OF THE INVENTION

The present invention is related to an improved method and apparatus by which patient information is entered, accessed and processed.

The invention relates to a method and apparatus for the storage of encrypted or otherwise similarly stored data. More particularly a method for recording personal, insurance and other information on a card or card-like medium. In turn, said information is or can be recorded and "read" from an area contained on said card that may or may not be visible to the naked eye and may or may not be readable by the naked eye. Said visible area is capable of containing a laser readable, magnetic strip or strips or other like means of information storage, for future dissemination.

Data management in the fields of medical, dental, ophthalmological, podiatric, chiropractic, pharmacological and other health care areas as well as in many professional fields has become a pervasive complex, financially expensive and time-consuming aspect in the provision of health care or respective services. The respective professionals must divert valuable time, energy and resources to address the ever expanding sea of paperwork and the complicated field of data management. Accordingly, service and care providers are unable to direct or focus a majority of their time to the provision of care and services that they otherwise would and the cost of providing patient care has increased while reimbursement has decreased. Insurance companies have gained an ever increasing presence in every imaginable field of health care as well as service industries, providing for the vast majority fee payments. For fee payment a literal plethora of forms, requests and releases must be filled out—for every individual patient—in order for the care or service provider to be paid, reimbursed or otherwise compensated for the services or care rendered.

For example, when a patient sees a new doctor or seeks treatment in a clinic or hospital for the first time, and in many instances every time thereafter, it takes the service or care provider, or their respective staff, between fifteen (15) minutes to one (1) hour—or more—to fill out all the forms, questionnaires, check the applicable sources and facts, check the information's accuracy and the completeness of all the above mentioned details. Additionally, for many reasons, it is often necessary to check with the insurance company, previous service providers, clinics and hospitals to insure the completeness, accuracy and veracity of the information provided. In many instances, the information as well as any supplemental material, must be gained and/or verified without the patient's/insured's help, and is therefore difficult to obtain quickly. Generally, the only readily verifiable identification that a patient's carries is a drivers license. The large number of managed care companies with all of their rules and programs have confused the patient and confounded the provider.

Identification issues aside, managed care, private insurance, business insurance plans and government sponsored health care generally account, or accounts in relative proportions, for payment of the vast majority of patient fees of those seen by a health care provider. Billing procedures and management are generally computer generated and managed in virtually all active practices, laboratories, emergency rooms, hospitals and clinics. Most major insurance carriers, as well as state health care programs and Medicare, encourage and/or only accepts electronically filed claims. Electronically filed claims expedite the processing and satisfaction of many claims submitted. Additionally, electronically filed claims vastly reduce the amount of unnecessary paper that would otherwise be required. In further evidence of the above, Medicare only accepts electronic claim. Medicare is presently accepted by 90% of physicians and essentially all hospitals, clinics and labs. Furthermore, due to the progressive aging of our society such electronic claims will rise out of necessity. A problem with the filing, processing and satisfaction of any electronically filed claim is that all the information must be absolutely correct and the format must be in full compliance with the requirements of the insurer.

At present, in a vast majority of the offices, patients complete questions on handwritten forms. A receptionist, who is usually not trained at or in data entry, must enter this patient and insurance information into the computer while concurrently accomplishing and performing many other tasks, duties and responsibilities. Not only is this inefficient, errors in data translation and entrance occur quite frequently, resulting from patient and/or provider employee error and/or omission. In the event procedures (i.e., and not limited hereto, biopsies, consults, blood specimens, culture trays) are performed or ordered, a patient's information and insurance's data must be again transcribed, providing another opportunity for error. Such errors may result in the insurance carrier's outright refusal or significant delay in payment for the care or service provided. All errors and/or omissions must be corrected before the insurance claim is paid—if at all. Such corrections requiring meticulous and time consuming review and additional phone calls that result in further delay in the providing services and claim payment—if payment is remitted at all. The whole process is very burdensome, time-consuming, costly, and aggravating for the patient, respective professional offices and insurance carrier. To address and partially remedy the aforesaid problems, while nevertheless giving rise to new ones, additional employees must be hired in a stop gap attempt to cope with errors, call insurance companies, review the patient's files and review all the aforementioned work to check and verify its veracity. In turn, the additional employees, paperwork and support mechanisms tend to interfere with the normal flow of patients, and subsequent rendering of care. Furthermore, many people have substantial difficulty filling out the long forms whereas others simply refuse to fill out the forms. These problems are ever compounding and increase in magnitude as the United States population ages. Furthermore, patients with language barriers, mental handicaps, the acutely ill and unconscious patients are partially and/or totally unable to complete any of the required forms for authorization of payment and more specifically and importantly treatment.

Other complicating aspects of managed care, or similar provided services, lie in the fact that each particular payment provider often has several programs with different requirements, restrictions, codes, forms and even several different billing addresses. As a result of all the above-mentioned problems another problem arises in the reluctance of medical care providers to comply with any additional record keeping and reporting requirements, especially in the midst of busy patient care. In addition, there are significant burdens associated with the time, cost and amount of paperwork required for proper patient processing that causes many physicians and institutions to reject particular insurance plans and carriers. This is socially troublesome as it effects the income of our physicians and hospitals and breaks the long standing doctor-patient relationships.

A need has clearly arisen whereby the care provider would have a method and device to assure accurate and complete demographic and insurance information on the patient, that may also include basic "medical-alert" information. The present disclosure addresses such needs.

A review of the present field of devices and methods that attempt to address some of the aforementioned problems, individually or in combination, evidences no such device as disclosed herein.

For instance medallions and bracelets have been worn by some persons suffering from particular conditions such as diabetes, hemophilia and antibiotic allergies. These provide very limited capability for information storage and dissemination and are often not worn. Thus, a need exists to provide a means for more adequately and thoroughly describing a person's medical history on a device which can be easily carried by all individuals. Furthermore, these devices fail to address the burdens associated with the insurance companies.

Relating to hospital or patient care environments, a label printer which makes self-adhesive labels from an identification plate attached to a patient wristband is described in promotional literature from Bio-Logics Products, Inc., Salt Lake City, Utah and in U.S. Pat. No. 4,145,966.

In U.S. Pat. No. 4,692,394, Drexler discloses a personal identification card on which there are recorded visual images, such as a face image or fingerprint, and laser recorded data. By means of in situ laser recording, transaction data, information, or the like related to the photographic image is recorded at subsequent times. For example, insurance claims or medical record entries may be processed sequentially. A photograph of the claimant is alleged to protect against fraudulent use of the card.

Miller, et al., U.S. Pat. No. 3,694,240, and Estrada, U.S. Pat. No. 4,325,570, disclose an identification systems in which an individual's fingerprint is taken at the time identification is to be made and compared to a fingerprint record in a master file of the person the individual purports to be. These disclosures are both time consuming and require the recording and maintenance of additional fingerprint files for verification.

In U.S. Pat. No. 4,730,849, Siegel discloses a device and system for the identification of medication in an attempt to assure that only the patient for whom the medication was prescribed will receive it. A photograph of the patient is affixed to the medication container, in the form of a label, and/or patient record, such as a medication card or chart. Alternatively, upon admission a patient may be issued a "non-removable" identifying wrist band having a machine-readable portion and, optionally, a computer-generated likeness or a photograph of the patient. Before treatment, the coded information on the patient wristband can be compared with that introduced into computerized central records upon admission.

In U.S. Pat. No. 4,236,332, Domo discloses a medical record card containing a microfilm portion having some data visible to the eye and other data visible by magnification. The directly visible data is alphanumeric character codes pertaining to emergency medical conditions of the patient and the magnified data portions detail the medical history.

In U.S. Pat. No. 4,213,038, Silverman et al., teaches an access control system with an identification card. The card has machine recordable indicia used to choose a master microspot pattern from the machine's memory. This master pattern is compared with an identical pattern on the card for verification. The card also has space for a picture and a signature. Similarly, in U.S. Pat. No. 4,151,667, Idelson et al., teaches an identification card having a photograph and a phosphorescent bar code pattern used for verification. The amount of information these cards can hold is extremely limited. Random microspot patterns can only be used for verification, while one dimensional bar codes can only represent a small amount of specific data.

Yet in other prior devices, systems have been proposed which include one (1) or more magnetic and manual entry data entry terminals at the health care provider facilities, various verification and authentication routines, data storage which includes lists of insurance companies or other payers together with lists of medical procedures for which such payers are obligated to make payments, schedules of permissible fees for such procedures and selected data related specifically to each covered patient. None of which claim reference to insurance forms and the errors associated therewith.

Such systems have, thus far, not featured a total health care approach nor delivery means, thus failing to adequately address the problems inherent with insurance. Nor, have such systems integrated the important elements of total health care system as contemplated by a total health management system. Since these missing functions, i.e. insurance processing, are important ingredients to a comprehensive medical care or insurance program, a need has arisen for a system that provides a full or more thorough integration of insurance processing.

In sum, none of the prior devices disclose a device that adequately displays the important insurance or medical history of an individual in a manner that may be easily read and used. Furthermore, none of the prior systems are sufficiently adaptable to inexpensive production. No reliable method for direct and accurate, insurance information has been achieved.

SUMMARY OF THE INVENTION

What is disclosed is a method and device that could be inexpensively produced by the insurance carrier and accordingly used by many service or care providers. The method described herein provides guidelines for the translation of the data from encoded or other formatted means into a system compatible with medical billing formats and the provision of care. Such a cost-effective method may be designed to save time, energy, resources and prevent errors. More importantly such a system that is disclosed herein and addressed, in part above, would also enable a manner by which services or care could be more efficiently provided. This could be accomplished through use of hand-held optical, desk-top or other scanner means.

The method and apparatus of this invention permit the recording, transmittal, and analysis of the insurance information, without limitation, by all participating medical care providers with a significant decrease in the paperwork requirements and, as a side benefit, provides for economic incentive to participating medical care providers. The method and apparatus of this invention successfully permits the acquisition and evaluation of insurance information from the patient to the care provider who then provides said information, coupled with information pertaining to the care provided, back to the insurance company or governmental entity. The invention meets the objectives of efficiently providing patient and insurance information. Therefore, reducing error filled forms and the resulting unnecessary costs and expenditures associated with remedying such errors. Misidentification or recording of incorrect or incomplete information is costly and can be life threatening. Furthermore, such material information will be "pre-coded" by the insurance provider. Thus, upon submission of a claim for services rendered, the insurance provider will be hard pressed to dispute the validity of their information.

An object of this invention is to provide a device that saves time at the care provider's office.

A further object of this invention is to alleviate the need to fill out complicated forms—to the patient and practitioner.

Another object of this invention is in avoiding essential information being forgotten.

Another object of this invention is in information being available in the event that the patient is unable to communicate.

Another object of this invention is in protecting confidential information.

Another object of this invention is in the protection against unauthorized use of insurance cards.

Another object of this invention is saving data entry time.

Another object of this invention is in it being cost effectiveness for the provider.

Another object of this invention is to eliminate errors in medical, personal and insurance information.

Another object of this invention is in being user friendly.

Other objects of this invention are speeding up the billing process and preventing the rejection of claims.

Another object of this invention is to reduce insurance company cost in reprocessing claims and resulting communications with providers and patient.

Another object of this invention is in the convenience and marketing advantage to patient and health care providers.

All the above objects may be met with a card having visually readable information on recordable or photographic material, i.e. a strip of laser recordable material, recorded in situ, disposed of on a wallet-size credit card-like medium. Accordingly, readable information, which may be adhered to a surface of the card, may relate to any personal attribute. Whereby other information pertaining to insurance or the insurance company may be similarly located. In turn, one of many vehicles may be used to record data on the strip, either by ablation, melting, physical or chemical change, thereby forming spots, coded sequences or other means for the transfer and dissemination of material. In turn, the spots or stripes of encoded material shall be represented by changes in reflectivity, and respectively encoded material.

By means of in situ laser recording, the transaction of data and information, or the like, related to the information previously recorded may be recorded at subsequent times. For example, insurance claims or medical record entries may be processed sequentially in the recording of various transactions on a strip, or like medium, one after another, without erasing or selectively erasing predisposed data. A photograph of the claimant may further protect against fraudulent use of the card.

In accordance with the device as herein provided, an integrated service is provided, that reduces time and direct and indirect costs often incurred through duplication of excessive paperwork (or its inappropriate utilization), thus enhancing the ability of the system to provide quality services and health care through efficient case management and service provider interaction.

The foregoing and other objects and features of the invention will be apparent from the following detailed description, by way of a description of a preferred embodiment, with reference to the drawings.

BRIEF DESCRIPTION OF THE DRAWINGS

FIG. 1. Is a front and rear view of one manner of a MEDICOMPUCARD;

FIG. 2. Is a representative data map for inclusion a the MEDICOMPUCARD;

FIG. 4. Is a representative patient registration form;

FIG. 5. Is an exemplary standard insurance form;

FIG. 6. Is an exemplary patient information form;

DETAILED DESCRIPTION OF THE PREFERRED EMBODIMENT

Figure 3:
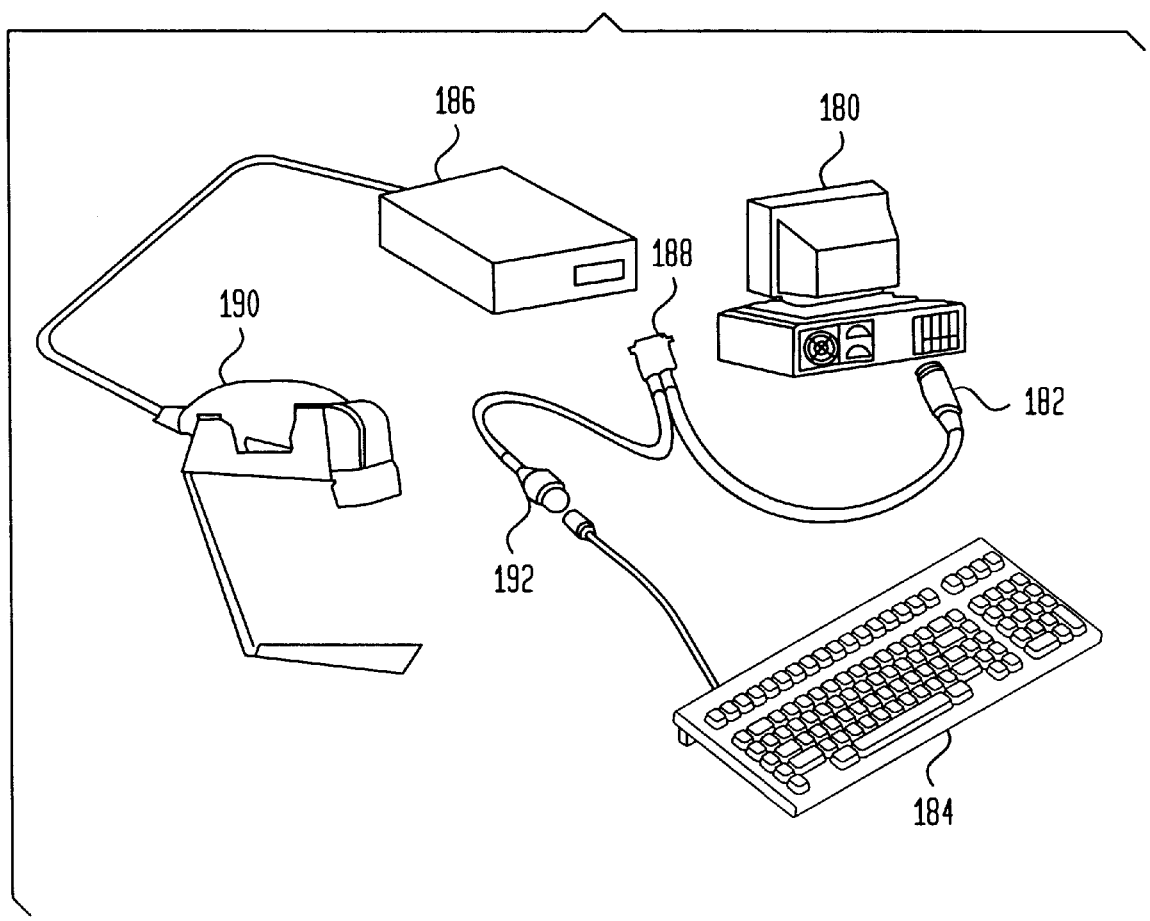
FIG. 3. Is a block diagram depicting possible devices for achieving the present invention.

The MEDICOMPUCARD may be physically similar the more common insurance card, and credit card-like counterpart and mediums.

FIG. 1 depicts a card 10 that may have the dimensions such as an ordinary credit card (approximately 3⅜"×2⅛"× 1/16"), but not limited thereto. On one side of the insurance card 10 there may appear characteristics similar to an insurance card and therein may contain the standard information on one side (front shown) 12—in a visually perceivable manner—such as name, policy number, group, type of coverage or other subjective materials as the case may warrant. On the other side of the card there shall appear a 2 dimensional bar-code, a PDF 417 bar code (all of the foregoing are for example only and are not to limit the manner by which information may be stored or retrieved) may be imprinted or otherwise placed upon the rear of the card 14.

A common type of 2-D bar-code is known as a PDF 417 bar-code and is capable of reliably storing several kilobytes of information. A kilobyte is 1024 bytes, or for our purposes here, characters. The ability to encode the entire Gettysburg Address in a single 2-D label has been demonstrated. This capacity is much greater than the common magnetic strip media found on the back of credit cards. The bar-code label is also permanently printed on the card and cannot be erased by magnetic fields as can the magnetic strip media products. Security devices presently in use at many retail stores utilize magnetic fields to deactivate merchandise control tags when purchases are made. These pose a hazard of erasure to credit cards or other magnetic media which may be placed in close proximity to them. Magnetic bars are often destroyed just by carrying them next to other cards in a wallet. Bar-codes, being an optical media, are not prone to the same type of hazards. The bar-codes can be produced by a variety of off the shelf software packages and can encode almost any alphanumeric data. Typically data will be typed into the software package much the same way as a simple word processor. The software can then produce a PDF 417 bar-code which will contain all of the encoded data. Personal data and health care information must be supplied by the patient to the insurance companies. This will be added to the insurance details which will be encoded on the cards produced by the insurer. Currently most insurance companies offer electronic claim submission. Use of the MEDICOMPUCARD will allow a single point of data entry, when the data is first encoded in the bar code. All personal and insurance data transfer beyond that will be electronic and chance for translation error and corruption is greatly reduced.

When the data is first encoded, it must conform to a set pattern or map.

FIG. 2 depicts one such manner for placement of information in the card's 10 data stream. The map specifies what piece of information goes where in the file. For example, the patients first name should always occupy the first 15 characters of the file, characters 0 through 14. The map is necessary to allow the data to be located and utilized once the bar-code is scanned.

The data map will be made available to the public for the express purpose of setting a standard and making the use of the MEDICOMPUCARD accessible to all medical software applications. Once the script is executed, the patients data will be imported into the local database as if the receptionist had typed it in, but no manual intervention will have been necessary.

Accordingly, the MEDICOMPUCARD may have a visible indicia bearing and portion with identification, medical data, and which may also have a medical record portion. This may be accomplished with one or more strips of self-proofed information. In one form the card may be made by reducing identified and certified medical history pages and producing a card containing the same in a readable format. A jacket having an opaque area is printed with visible indicia such as the identification of the person and medical data. A backing is added, and the visible indicia are read against the backing.

A magnetic tape may be added for storing machine readable information. For instance, in a "dog tag" size card, the frames are arranged in a substantially square area in the card, and a hole for receiving a body member encircling chain penetrates the visible indicia bearing portion card wherein a supporting card contains a portion having indicia visible to the human eye coded for particular chronic conditions which effect emergency treatment and having indicia visible by use of a reader which detail the medical information and identification data of the patient. The supporting card contains the code for the indicia which alert medical personnel to chronic conditions and, in addition, contains some important identification data about the patient and about the type and use of the card.

FIG. 3 depicts examples of devices that may be used in conjunction with the present invention. Accordingly, the bar-code may be read by a 2 dimensional or like bar-code scanner 190. These scanners 190 can be hand held devices much like the one used in department stores to scan the UPC symbols on the merchandise. They are different however, in the fact that the devices required for the MEDICOMPUCARD are capable of decoding 2 dimensional or like bar-codes. UPC symbols are not 2-dimensional; they are 1-dimensional and contain only a very short numeric string. As stated before, 2-D bar-codes can store much more data and when PDF 417 bar-codes are decoded with a 2 dimensional bar-code scanner, the encoded data is computer readable as an ASCII text stream and is as simple as a string of characters being letters, numbers and spaces. The scanner 190 acts in conjunction with a key board wedge decoder 186, via connector 192 to the key board 184 and connector 182 to the computer terminal 180. Instead of typing the letters and numbers into the computer 180 using the keyboard 184, the scanner 190 sends the entire packet of alphanumeric data in a single stream. All of the encoded data is sent at once to the PC 180 as one large unformatted group of letters, numbers and spaces. This stream of numbers and characters appears much like a jumbled text file. This is the precise reason that the data must be encoded following a standard map. If, for example the patients billing address is required, it can be found and read from a range of predetermined character locations. The map is necessary to ensure that all of the data represented can be read and inserted into the correct fields on the physician's computer 180. Other 2 dimensional bar code scanners symologies may include "Maxicodes".

In turn, in order to capture the data stream, the receptionist scanning the card may invoke a simple text editor or other utility capable of accepting a continuous text stream. These types of applications are standard with many operating systems. Some are DOS Edit for DOS operating systems, WordPad, Write, or Notepad in Windows systems or the VI editor in UNIX systems. Additionally, the disclosure may allow for the using physician to integrate and/or update the programing via a simple generic or otherwise custom application that will in turn accept text and save the resulting file. Once the text editor application is started, the card is scanned which enters the data into the editor as if it was typed. The file then must be saved to a temporary file on the hard disk drive of the PC 180. After saving the text file, now containing all of the patients data, a custom script must be executed to import this data into the existing office database. Additionally, the card's format or internal coding may be altered or updated via provider updates through the use of computer software on the part of the insurance company. Conversely the physician's computer data base could also be updated so as to have the functionality to utilize the data contained on the MEDICOMPUCARD. Thus, a script may be written in almost any language or a script may be custom written for the specific database software that the office is using. Thus, a custom script would enable the card's issuer (s) to over come the obstacles associated with the wide variation of software used in the medical and like professions. As each program stores information in different fields and locations in the database, as well as different methods used to import text data, most likely be necessary for the database developers to write the custom scripts.

FIG. 4 is exemplary of past registration forms that required line by line manual information insertion while in the physician's office.

FIG. 5 is exemplary of data as it may be pre-encoded through the use of the invention and displayed on the physician's computer monitor for subsequent download, modification and return to the insurance carrier.

FIG. 6 is exemplary of data as it may be pre-encoded through the use of the invention and displayed on the physician's computer monitor for subsequent download, modification and return to the insurance carrier.

Figure 7:
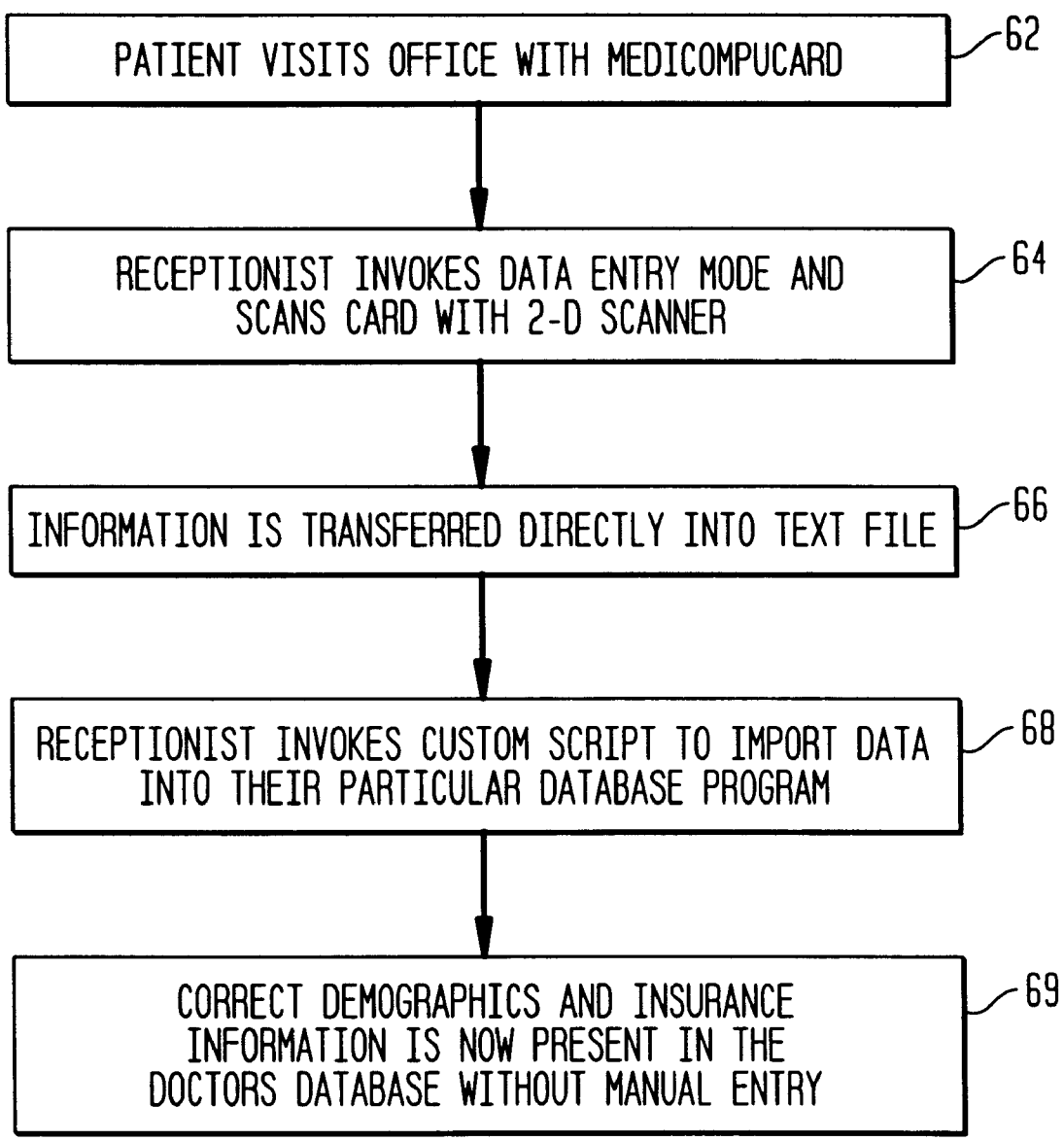
FIG. 7. Is a general block diagram depicting an example of the present invention.

FIG. 7 depicts a flow chart of one way the invention may be used. Accordingly, a patient may visit the doctor's office with the MEDICOMPUCARD (shown at 62) following presentation of which the receptionist may scan the rear of the card 14 into the database (shown at 64). Following scanning 64, the information would be transferred into a text file 66 for importation into the particular physician's database 68. Following entrance into the database 68 the material may be printed out and presented to the physician without manual entry (shown at 69).

Figure 8:
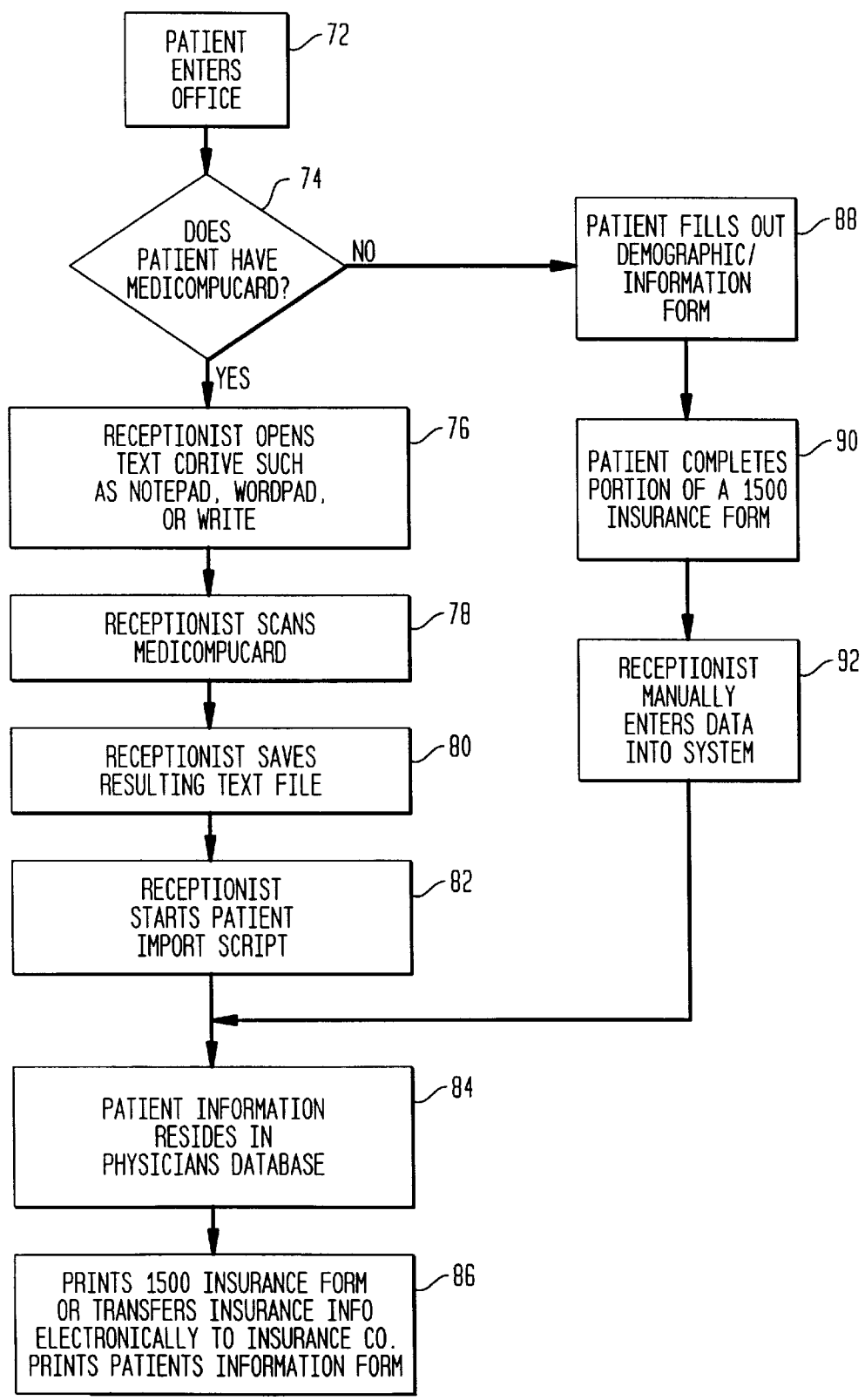
FIG. 8. Is a detailed block diagram depicting an example of the present invention, and FIG. 9. Is a 1500 standard health insurance claim form.

An example of a process according to the present invention is depicted in FIG. 8:

A patient enters a physician's office 72. If the patient has a MEDICOMPUCARD (yes or no 74) the card 10 is presented to the receptionist (shown at 76), and in this case the receptionist then opens a text file to read the card 10 (shown at 76). Then the receptionist scans the card (shown at 78), by means of a scanner keyboard wedge interface 190, and the receptionist in turn saves the scanned information, that is shown on his/her screen, in the resulting text file (shown at 80) and, subsequently, the information will be entered in to a PC 180. Then the previously encoded information will then be entered into the physician's database for application and use 82 with the use of an import script. Alternatively, if the patient does not have a MEDICOMPUCARD (no, at 74) then the patient must fill out the forms by hand (shown at 88 and 90) (88, patient fills out demographic form and 90, patient completes portion of the "1500" insurance form) after which the receptionist manually enters the information into the physician's system (shown at 92). In either case, the patient with or without the card 10, the information will end up on the physician's database (as shown at 84). But of course, the simplicity of using the card 10 associated with the present invention is apparent herein. The receptionist may then save the file or files, or selected portions thereof for other applications, on to a PC's 180 hard disk drive, floppy drive or like file. After the file is saved, a custom written import script may be executed and the resulting information printed for mailing, fax transmission or other method for transfer back to the insurance company (shown at 86) (eg, a "1500" insurance form or other electronic transfer method is used to supply information to the insurance company).

Figure 9:
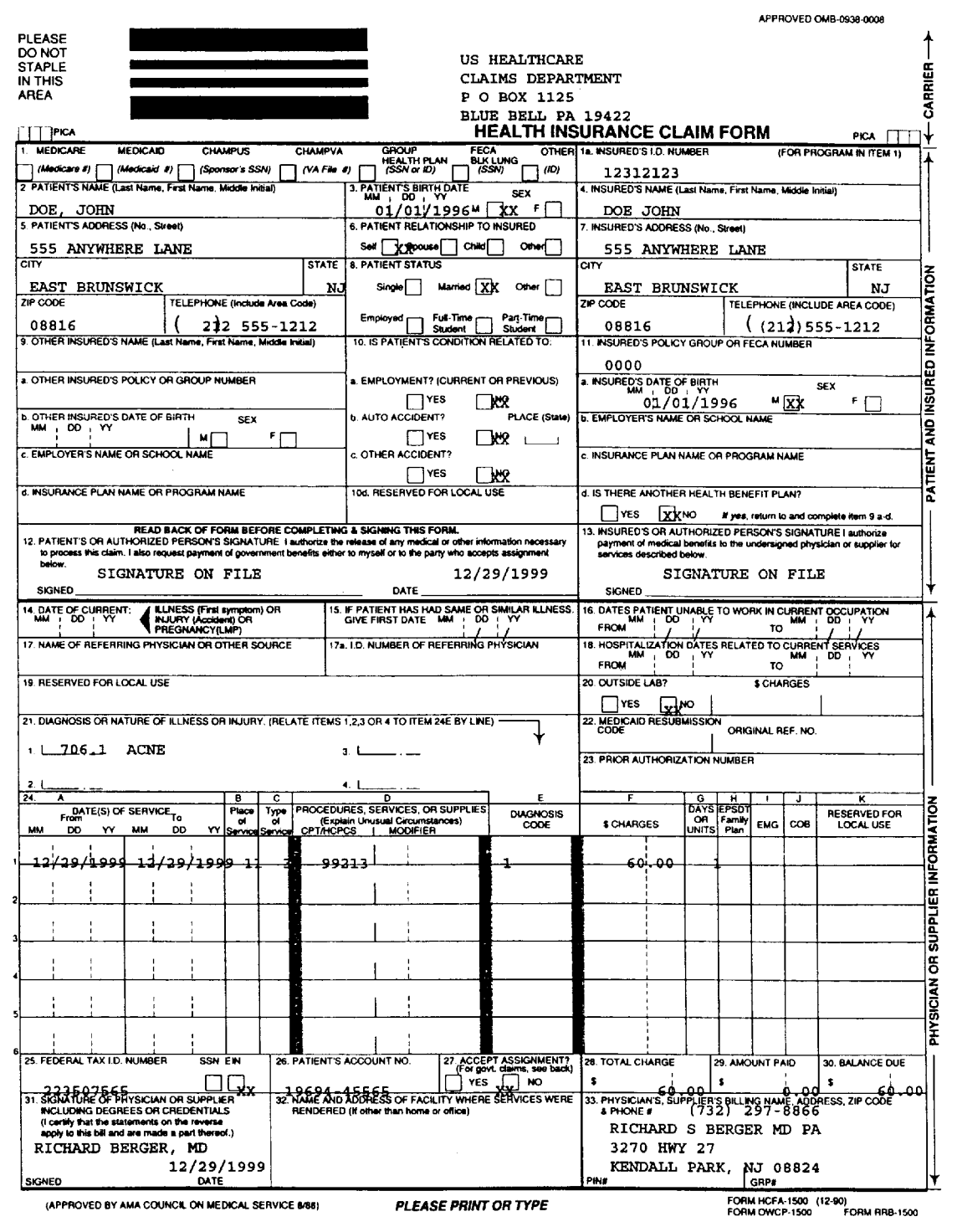

FIG. 9 is a representative of a "1500" standard health insurance claim form that a patient must fill out upon entrance into the doctors office.

Use of the MEDICOMPUCARD will help reduce, if not eliminate errors related to inaccurate insurer and patient information. This in turn will help decrease the number of claims returned from the insurance to the patient and provider and will decrease the expense involved to the health care provider and insurance company. It will make the whole system more efficient for everyone involved in the health care system.

The method and apparatus of this invention may also permit more timely quality reviews by medical insurers of ambulatory patient care, and payment for the same, by gathering medical data on each and every ambulatory visit and by providing a unique data transmission system to timely and accurately report the data for analysis. Implementation of the method and apparatus of this invention should permit significant cost savings for the health care insurance system.

We claim:

1. A process for a goods or services provider to supply patron data to a payment provider comprising the steps of:

a. scanning a data card provided by a patron to retrieve data indicative of said patron;

b. inputting supplemental patron data indicative of the goods or services procured by said patron;

c. merging said data indicative of said patron and said supplemental patron data, and sending said merged data to a payment provider, so that said payment provider will remit payment for said goods or service to the provider of said goods or service;

d. printing a record indicative of said patron data, wherein said record includes a statement as to the reason for which the patron patronized said goods or service provider.

2. A process as described in claim 1, wherein said record indicative of patron data is in a form which facilitates use with standard forms used by insurance providers.

3. A process for supplying patient data to an insurance company comprising the steps of:

a. scanning a data card provided by a patient to retrieve patient data;

b. inputting patient servicing data indicative of the services rendered by a medical service provider on behalf of said patient;

c. merging said patient data and said patient servicing data, and sending said merged data to said insurance company so that said insurance company will remit payment to said medical service provider;

d. printing a paper record indicative of said patient data, wherein said patient data is patient registration information for a medical chart including information as to the reason said patient visited said medical service provider.

4. A process for supplying patient data to an insurance company as in claim 3, wherein said printed record includes printed information suitable for transmission to said insurance company.

* * * * *

UNITED STATES PATENT AND TRADEMARK OFFICE
CERTIFICATE OF CORRECTION

| | |
|---|---|
| PATENT NO. | : 6,112,986 |
| DATED | : September 5, 2000 |
| INVENTOR(S) | : Richard S. Berger, Michael Witt |

Page 1 of 1

It is certified that error appears in the above-identified patent and that said Letters Patent is hereby corrected as shown below:

<u>Title Page,</u>
Michael Witt's names is incorrectly shown as "Michael A. Witt". There is no middle initial and the name should read "Michael Witt".

The address listed for Michael Witt is incorrect.
The correct address is :
        418 Wenthrop Circle
        Rockledge FL 32955

Signed and Sealed this

Twenty first Day of August, 2001

*Attest:*

*Nicholas P. Godici*

*Attesting Officer*

NICHOLAS P. GODICI
*Acting Director of the United States Patent and Trademark Office*